March 8, 1966  E. A. VON SEGGERN ETAL  3,238,930
EXCESS AIR CYCLE ENGINE
Filed May 6, 1963  3 Sheets-Sheet 3
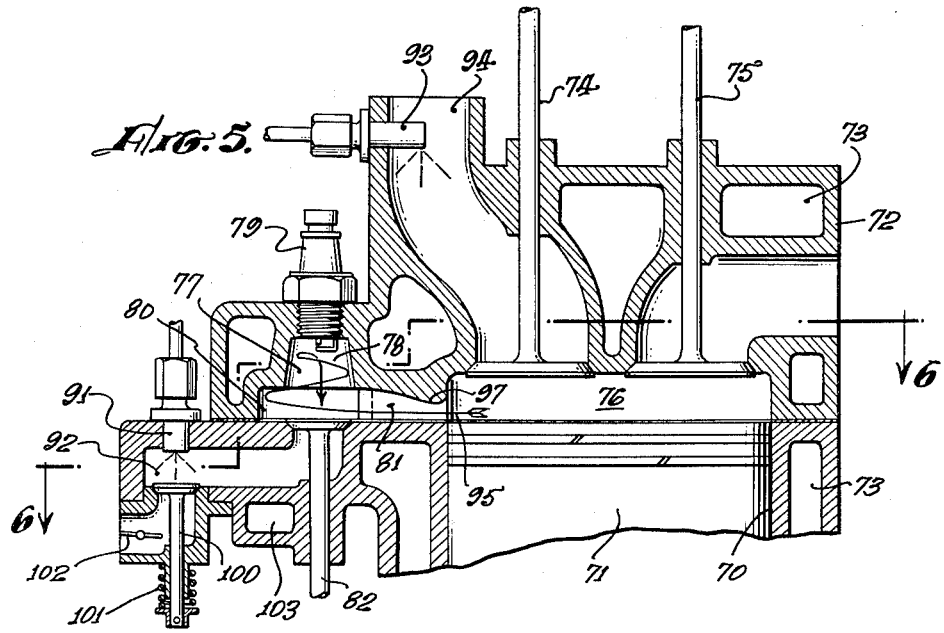
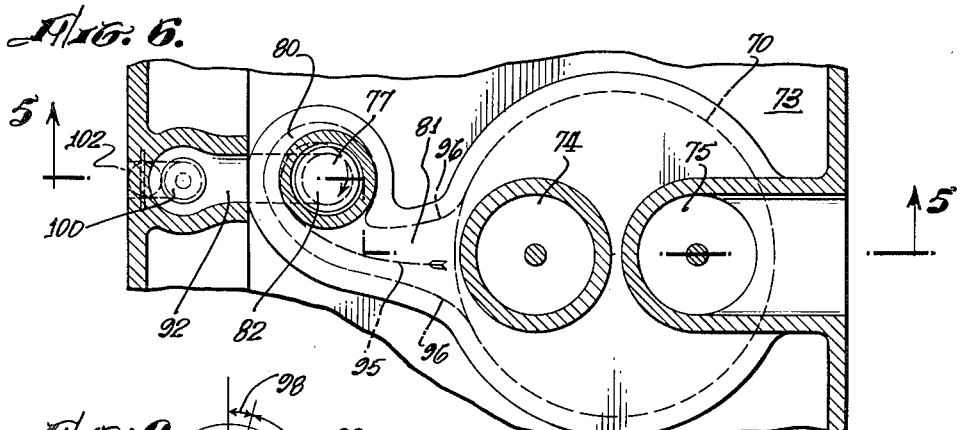
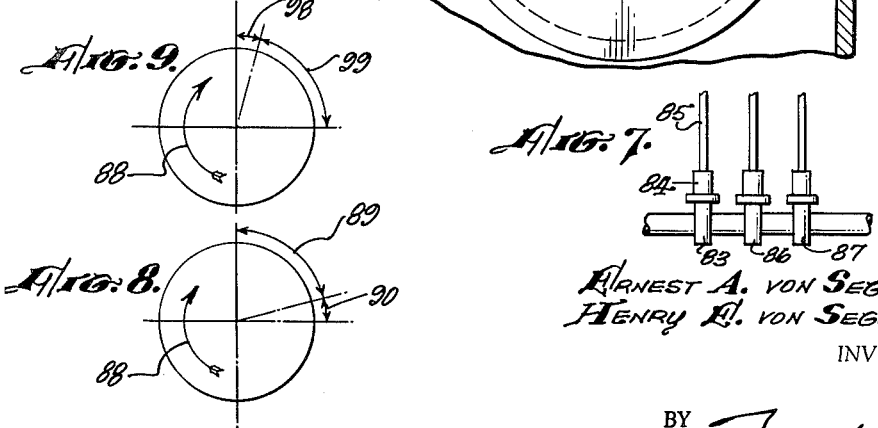
ERNEST A. VON SEGGERN,
HENRY L. VON SEGGERN,
INVENTORS.
BY Forrest J. Lilly
ATTORNEY.

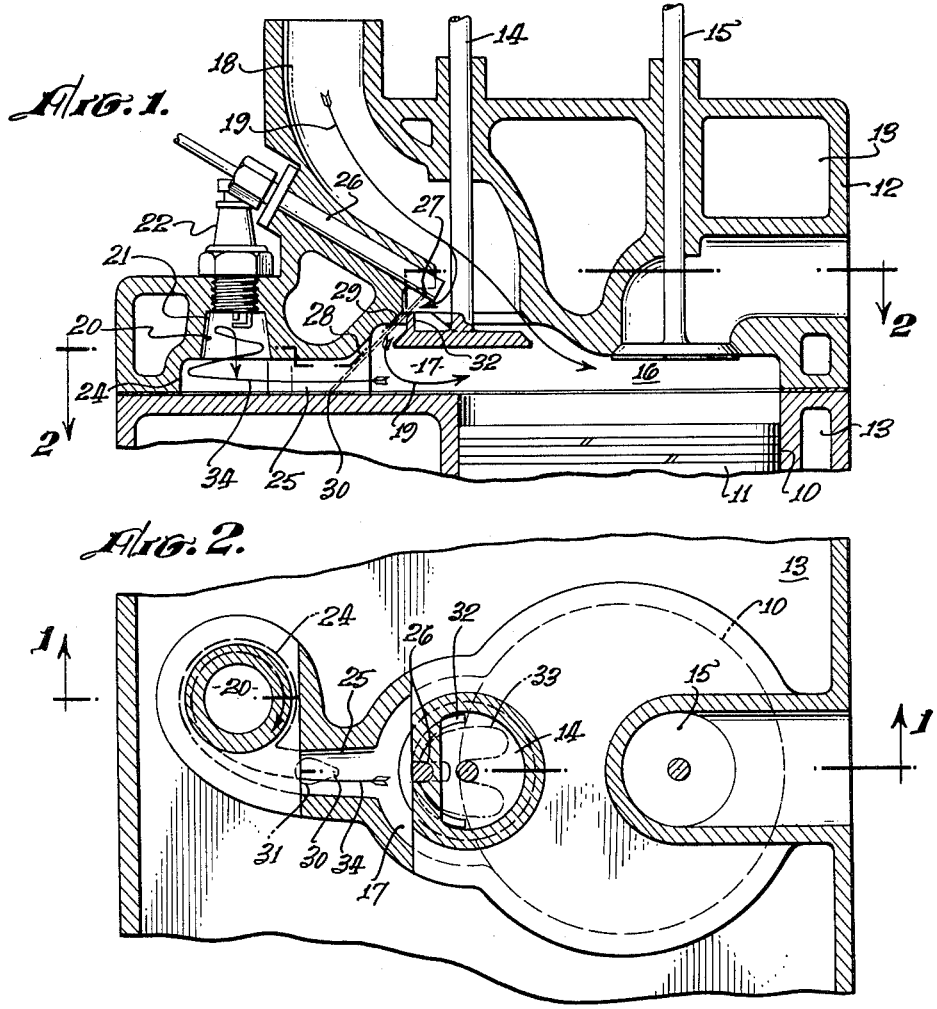

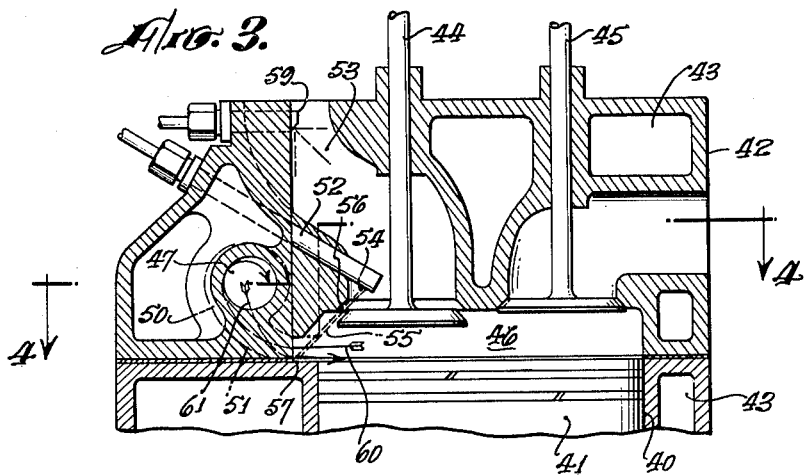
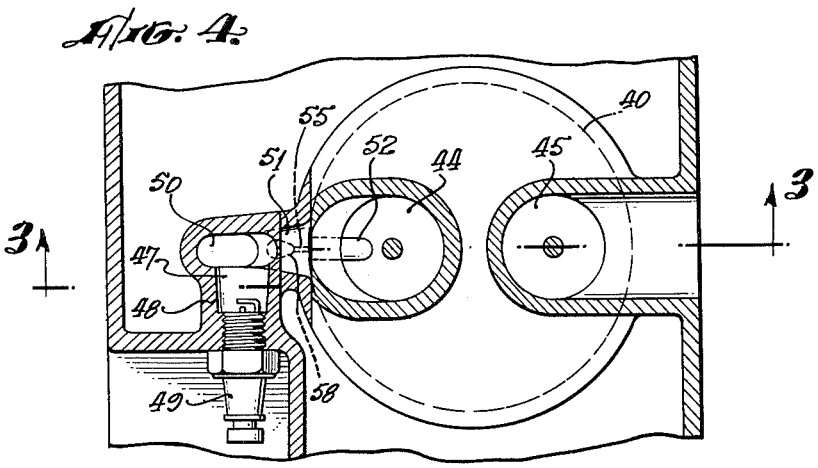

United States Patent Office 3,238,930
Patented Mar. 8, 1966

3,238,930
EXCESS AIR CYCLE ENGINE
Ernest A. von Seggern, 1051 E. Angeleno, Burbank, Calif., and Henry E. von Seggern, Rte. 2, Box 1910, Escondido, Calif.
Filed May 6, 1963, Ser. No. 278,383
4 Claims. (Cl. 123—32)

This invention relates to combustion chambers for internal combustion engines, and in particular to chambers which are designed to operate with excess air during part load operation. Fuels such as gasoline or light distillates are suitable for use. The chambers described herein are a special version of the more general type of excess air combustion chambers described in U.S. Patent Nos. 2,808,036 and 2,808,037, which are suitable for both light and heavy fuel.

It is a general object of the invention to provide a combustion chamber of the type described in which light fuel is burned in the presence of excess air at part load and a clean, odorless, non-smog producing combustion is obtained. Another object is to provide a combustion chamber in which high thermal efficiency, especially at part load operation, is obtained.

Other more specific objects include the provision of a combustion chamber to which liquid fuel is supplied with a simple, low pressure, non-atomizing fuel injection system prior to the compression and combustion cycle, and with non-critical timing relative to the engine cycle. Also the provision of a combustion chamber which operates at all times on a full unthrottled air charge, utilizes a conventional spark ignition system, and may be operated over a wide range of compression ratios and engine speeds with high specific output while using relatively low octane fuel.

Other general objects and features of the invention as well as special objects and features will be described in the specification in conjunction with the description of the specific forms shown herein.

The combustion chambers by means of which the foregoing objects are attained make use of an ignition flame induced combustion of a fuel-air mixture of variable fuel-air ratio, in which the ignition flame is obtained from a fuel-air mixture of substantially stoichiometric proportions and fixed size. One of the chambers to be described is also characterized by the use of the basic principle on which the engines described in U.S. Patent Nos. 2,808,036 and 2,808,037 operate. This is the method of producing an ignition flame of fixed size by injecting a fixed quantity of fuel into an ignition chamber of fixed and appropriate size such that when a full unthrottled charge of air is compressed into said ignition chamber a stoichiometric fuel-air mixture is formed in said chamber. Furthermore, the fuel-air mixture is maintained completely independent of any fuel in the remainder of the combustion chamber by means of a body of air which is interposed between said mixture and said other fuel during the compression cycle while said mixture is being formed. This method makes possible the use of early fuel injection well in advance of the compression cycle, to provide the time for proper fuel preparation which is one of the essential elements for obtaining clean, smog-free combustion.

The second combustion chamber to be described is also characterized by the use of an ignition chamber in which a stoichiometric fuel-air mixture is prepared in combination with a variable fuel-air mixture in the main combustion chamber, but differs in that this mixture is formed from two separate supplies of fuel, part being obtained from fuel dispersed in the air compressed into the ignition chamber during the compression cycle, and the balance from an independent supply delivered to the ignition chamber directly. These two fuel supply means are coordinated so that the sum of both produce a stoichiometric mixture, while the fuel-air mixture in the main combustion chamber can vary from all air (no load) to a stoichiometric mixture (full load).

The third combustion chamber to be described is similar to the second chamber in that it has two separate fuel supplies, but differs in that both the fixed ignition charge and variable main charge are prepared externally. These two charges are introduced into the combustion space in sequence, and are held separately in the ignition and main combustion chambers respectively.

Additional features of the combustion chambers will be described in conjunction with a description of the engines and their modes of operation. In the accompanying drawings, showing typical illustrative embodiments of the broad invention:

FIG. 1 is a vertical section of the first form of the engine taken along the broken line 1—1 of FIG. 2;

FIG. 2 is a horizontal section of the same engine taken along the broken line 2—2 of FIG. 1;

FIG. 3 is a vertical section of the second form of engine taken along the broken line 3—3 of FIG. 4;

FIG. 4 is a horizontal section taken along the broken line 4—4 of FIG. 3;

FIG. 5 is a vertical section of the third form of engine taken along the broken line 5—5 of FIG. 6;

FIG. 6 is a horizontal section of the same engine taken along the broken line 6—6 of FIG. 5;

FIG. 7 is a diagrammatic view of a typical cam and push rod valve gear;

FIG. 8 is a valve timing diagram for a first version of said engine; and

FIG. 9 is a valve timing diagram for a second preferred version of said engine.

The first form of the combustion chamber will be described as it is incorporated in a conventional four cycle, water-cooled engine, but it is evident that air cooling or other forms of cooling may be employed and that the principles could also be adapted to two cycle forms. In FIGS. 1 and 2 a cylinder 10 with reciprocating piston 11 therein has a cylinder 12 fastened onto the upper end, and both cylinder head 12 and cylinder 10 are water cooled by means of jacket 13. An inlet valve 14 and an exhaust valve 15 are located in head 12 and above said cylinder and are operated in the conventional manner by the usual mechanism (not shown).

Formed within head 12 is the main combustion chamber 16 which has a pocket 17 partially offset from said cylinder as shown in FIG. 1. The inlet valve opens directly above the cylinder 10. An intake manifold 18 is provided which is arranged to direct air entering the cylinder 10 during the intake stroke of the engine to flow in a line 19 which branches with some air entering said cylinder directly and some entering pocket 17 in a direction generally away from the central axis of cylinder 10 and then turning in a U back towards the cylinder and entering said cylinder as shown.

An ignition chamber 20 which consists of a small generally conical cavity 21 is located in said cylinder head 12 near said pocket 17 and has a spark plug 22 located substantially on the length axis of said conical cavity. An annular groove 24 of diameter somewhat larger than that of the cylindrical cavity is formed at the end of said ignition chamber opposite said spark plug, and a passage 25 joins said annular groove tangentially substantially in the plane of said groove, and also joins said pocket 17. The spark plug 22 may be located on the other end of said ignition chamber adjacent the annular groove, but still on the central axis of cavity 21 if desired.

Passage 25 is oriented such that its length axis, if extended, would intercept the edge of valve 14 at a point most remote from said cylinder 10 and pass substantially through the center of said pocket and on into cylinder 10.

A non-atomizing type of fuel injector 26 is provided and extends into intake passage 18 at a point just above intake valve 14. It has an orifice 27 which is designed to direct injected fuel in a stream 28 in a direction such that it will pass through between valve 14 and its seat 29 when said valve is open and pass on into passage 25. The stream impinges at a point 30 and forms a fuel body 31 on a wall of said passage 25. The intake valve 14 is provided with a raised rim 32 which extends along about ⅙ of the periphery of said valve, and is centrally located with respect to said injector. The valve is provided with conventional means (not shown) for maintaining this orientation of said rim. The rim is high enough so that when said valve is closed the rim will intercept the fuel stream and cause it to collect on the valve head behind said rim as shown by the dotted outline 33. When the valve is in its maximum open position, the rim does not intercept the fuel stream, and the fuel then passes through the valve as shown in FIG. 1.

Fuel is supplied to the injector 26 by a fuel pump (not shown) of the type which has a fixed end of injection and a variable beginning. The pump is timed with respect to the engine so that the fixed end of injection occurs at about the mid-point of the intake stroke when the intake valve is in its maximum open position. When the minimum (idle) fuel charge is injected, this takes place while the intake valve is open. At full load, injection begins at about the middle of the exhaust cycle, while between full and idle load, injection begins later but always ends at the same point.

The engine operates as follows: At full load, fuel injection begins when the intake valve is closed, and most of the total charge of fuel is intercepted by rim 32 and collects on the back of the valve head, as indicated by the dotted outline 33 (FIG. 2). As soon as the intake valve begins to open, air flows into cylinder 10 at the beginning of the intake cycle as shown by flow line 19 and this fuel is picked up and carried into said cylinder via the pocket 17. The unvaporized portion is thrown against the walls of said pocket and is vaporized by heat from said pocket walls. As the piston moves down the intake valve opens wider and a point is reached at about ¼ or ⅓ of the intake cycle when the rim no longer intercepts the fuel stream 28 and the fuel is able to flow in a stream directly into passage 25 and impinge at point 30, forming a fuel body indicated by the dotted outline 31. The injector 26 projects into the intake manifold and forms a shield against the full force of the intake air stream so that the injected fuel stream can pass into said passage without being disrupted by the air.

Injection is then terminated by the pump and as air continues to flow into said cylinder any fuel remaining on said valve or in said pocket is vaporized and carried into said cylinder, while the fuel deposited in passage 25, being out of the path of the flowing air, remains in said passage. At the end of the intake cycle the cylinder is filled with a fuel-air mixture of substantially stoichiometric proportions (full load only), the pocket 17 is filled with air only, and a small quantity of fuel is retained in passage 25.

During the compression cycle the piston 11 rises and compresses the air and fuel charge all into the combustion space 16. Compression induces a flow into the ignition chamber 20 and the flow follows the line 34 as shown. The air in pocket 17 being next to passage 25 and lying between said passage and cylinder 10 in which the fuel-air charge is held, is compressed into passage 25 ahead of said fuel-air mixture. The air in pocket 17 acts as a buffer between the ignition chamber and the cylinder and separates the ignition chamber from the fuel in cylinder 10. Flow 34 from pocket 17 consists of air only, and in flowing up passage 25 it vaporizes and carries with it the body of fuel deposited on the wall of said passage during the intake cycle. The air flow in the ignition chamber spirals up the chamber, thence past the spark plug and down the central axis of said chamber as shown. The fuel-air ratio of the mixture formed in the ignition chamber is substantially stoichiometric and is controlled by varying the quantity of fuel deposited in passage 25 relative to the volume of air compressed into the ignition chamber at the end of the compression stroke. Means for controlling the fuel-air ratio will be described later.

Shortly before top-dead-center the fuel-air mixture in the ignition chamber is ignited by spark plug 22 and the resultant flaming mixture rushes forcefully out through passage 25 and spreads out through pocket 17 and the remainder of the combustion space 16, igniting any fuel that is contained in said air. After the power stroke the products of combustion are exhausted through valve 15 in the usual manner.

At no load operation the force of the ignition flame alone is sufficient to idle the engine. The volume of the ignition chamber is designed so this is correct. In operation a full charge of air is taken in through passage 18 but injection begins only after intake valve 14 is open enough so that rim 32 does not intercept the fuel and all of the charge is deposited in passage 25. Since there is no air movement in passage 25 during the intake cycle the fuel remains undisturbed until the compression cycle, when it is vaporized by stream 34. The same fuel-air mixture is formed in the ignition chamber at idle load as at full load. At variable load, between idle and full load, the ignition chamber charge is always constant while the power of the engine is controlled only by the quantity of fuel that is carried into cylinder 10 by stream 19.

In order to adjust the fuel-air ratio in the ignition chamber for optimum combustion, the time of the end of injection is varied relative to the point at which the rim 32 just fails to intercept the fuel stream 28. Hence, the later in the cycle that fuel injection terminates the greater the quantity of fuel deposited and the "richer" the fuel-air ratio becomes.

The second form of excess air cycle engine is shown in FIGS. 3 and 4. The engine is similar to the first form in that it also has a fuel injector which is adapted to inject liquid fuel in a stream through the open inlet valve and deposits the fuel in the ignition chamber. This engine is distinguished from the first form in that it does not have an auxiliary pocket in the combustion chamber, and it has dual fuel supply means.

In FIGS. 3 and 4, a cylinder 40 with reciprocating piston 41 therein has a cylinder head 42 fastened onto the upper end, and both cylinder head and cylinder are water cooled by means of jacket 43. An inlet valve 44 and an exhaust valve 45 are located in head 42 and above said cylinder and are operated in the conventional manner by the usual mechanism (not shown).

Formed within head 42 is the main combustion chamber 46 into which said inlet and exhaust valves open. An ignition chamber 47, which consists of a small conical cavity 48, is located in said cylinder head near said intake valve and has a spark plug 49 screwed into one end thereof. An annular groove 50, of diameter somewhat larger than that of the conical cavity, is formed at the end of said cavity opposite said spark plug, and a passage 51 joins said groove tangentially substantially in the plane of said groove. The other end of said passage joins said combustion chamber 46 adjacent said inlet valve.

A non-atomizing fuel injector 52 projects into the intaken manifold 53 at a point just above said intake valve, and has on orifice 54 which is designed to direct injected fuel in a stream 55 such that it will pass through between valve 44 and its valve seat 56 when said valve is open. The stream is directed so that it will enter passage 51 and impinge on a wall 57 and form a fuel body 58. A second fuel injector 59, which may be either an atomizing or non-atomizing type, projects into said intake manifold 53 at a point upstream from the intake valve 44.

The engine operates as follows: At no load, the engine is designed to operate entirely on combustion in the ignition chamber, with air only in the cylinder. Accordingly, fuel is injected through injector 52, during the intake cycle while said intake valve is open, in a stream 55 and forms fuel body 58 in passage 51. No fuel is injected through injector 59. During the compression cycle, air is compressed into the ignition chamber as indicated by flow line 60 and this air passes over and vaporizes the fuel body 58. The quantity of fuel injected is adjusted so that a substantially stoichiometric fuel-air mixture is formed. At near top-dead-center this mixture is ignited by spark plug 49 and the resulting combustion develops enough power to idle the engine.

Passage 51 is curved in a vertical plane, and the fuel body 58 is located on the concave part of said passage. When the ignition flame rushes out of said passage towards cylinder 40 as shown by flow line 61 it is directed by the curved passage directly against the region where the fuel body 58 was deposited. If any fuel remains after vaporization, it is burned off by the ignition flame.

At full load, no fuel is injected through injector 52, but sufficient fuel is injected through injector 59 to form a stoichiometric fuel-air mixture with all the air entering cylinder 40. Fuel injection into the manifold may be timed or continuous, atomized or non-atomized, as it may be vaporized from the walls of the manifold. During the compression cycle a portion of the stoichiometric fuel-air mixture is compressed in said ignition chamber, and this is ignited by the spark plug 49 to produce maximum power.

At part load, between these two extreme conditions, some fuel is injected through both injectors, so that fuel for the ignition chamber is obtained from two sources. The two fuel supplies are coordinated so that the sum of both form a stoichiometric fuel-air mixture, while the power of the engine is controlled by the quantity of fuel injected through injector 59. The ignition flame fires the "lean" mixtures in combustion chamber 46 at part load equally well over the entire load range.

The third form of exces air cycle engine is shown in FIGS. 5, 6, 7, 8 and 9. It is similar to the second form in that it has dual fuel supply means, but the fuel charge for the ignition chamber is formed outside of the combustion chamber. This engine is characterized by the admission in sequence of a variable fuel-air ratio mixture, and a spark ignitable fixed-fuel-air ratio mixture to the combustion spaced and the retention of said fixed-fuel-air ratio mixture in an ignition chamber while the variable ratio portion is held in the engine cylinder.

In FIGS. 5 and 6 a cylinder 70 with reciprocating piston 71 therein has a cylinder head 72 fastened onto the upper end, and both cylinder head and cylinder are water cooled by means of jacket 73. An intake valve 74 and an exhaust valve 75 are located in head 72 and above said cylinder and are operated in the conventional manner by the usual mechanism (not shown).

Formed within head 72 is the main combustion chamber 76 into which said inlet and exahust valves open. An ignition chamber 77, which consists of a small cavity 78 is located in said cylinder head near said cylinder, and has a spark plug 79 screwed into one end thereof. An annular groove 80 of diameter somewhat larger than cavity 78 is formed at the end of said cavity opposite said spark plug, and a passage 81 joins said groove tangentially substantially in the plane of said groove. The other end of said passage joins said combustion chamber 76. An auxiliary inlet valve 82 opens into said ignition chamber opposite said spark plug, and is operated in the usual manner by means of a cam 83, cam follower 84 and push rod 85. The cam shaft also has cams 86 and 87 which operate the intake valve 74 and exhaust valve 75 in the conventional manner. A valve timing diagram is shown in FIG. 8 in which the upper right-hand quadrant represents the intake cycle of a four cycle engine, and time is taken in clockwise rotation as indicated by arrow 88. The intake valve opens near top-dead-center at the beginning of the intake stroke and remains open for the period of time indicated by the double ended arrow 89. Simultaneous with the closing of said intake valve, the auxiliary intake valve 82 opens and remains open until the end of the intake stroke, as indicated by double ended arrow 90. A fuel injector 91 extends into auxiliary intake manifold 92, and a second fuel injector 93 extends into main intake manifold 94. These injectors may be either atomizing or non-atomizing types.

The engine operates as follows: At no load, the engine is designed to operate entirely on combustion in the ignition chamber, with air only in the cylinder. Accordingly, at no load operation fuel is supplied to injector 91 but none to injector 93. At the beginning of the intake stroke inlet valve 74 opens in the usual manner and air only is drawn into cylinder 70 through intake manifold 94. Near the end of the stroke inlet valve 74 closes and simultaneously auxiliary inlet valve 82 opens, so that air and fuel supplied to it by injector 91 is drawn through manifold 92 and through said ignition chamber and down passage 81 toward said cylinder. The valve 82 closes again as piston 71 reaches the end of its intake stroke, and the duration of valve open time is adjusted to said piston displacement so that just enough fuel-air mixture is drawn in to fill said ignition chamber and passage, but none is drawn beyond into said cylinder in any appreciable amount. During the compression cycle, the air in cylinder 70 is compressed, and enters passage 81 driving the fuel-air mixture ahead of it. The fuel-air mixture is accordingly compressed back into the ignition chamber, and a compression induced flow is established which follows the path indicated by flow line 95. The fuel charge is caused to circulate in the annular groove 80, thence in a spiral path up the side walls of cavity 78, then inward in a converging spiral past the spark plug 79 and centrally back down again. This concentrates the fuel mixture around the spark plug and air which enters from said cylinder is confined to an outer shell around said fuel. This insures that the fuel-air ratio at the spark plug is not changed from that of the mixture taken in, which is, of course, adjusted to stoichiometric proportions. When this charge is ignited, the power produced is just sufficient to idle the engine. The volume of the ignition chamber is made so that this is correct.

At full load, fuel is injected through injector 93 at a rate to produce a stoichiometric fuel-air mixture which fills the cylinder 70 during the initial intake stroke. Then valve 74 closes as before and valve 82 opens, whereby the ignition chamber is also filled with a stoichiometric fuel mixture. The same flow 95 takes place, but the fuel-air mixture at the spark plug remains stoichiometric as before, whether the compression introduces air or a fuel mixture. The charge is ignited as before, and the ignition flame rushes out through passage 81 and ignites the fuel charge in combustion chamber 76. The end of passage 81 is formed like a flattened nozzle, its side walls 96 diverging, while the upper wall 97 bends down. This makes the flame entering the combustion space 76 fan out and spread uniformly through the fuel charge therein, igniting the entire charge quickly and completely. At intermediate, variable loads, the quantity of fuel injected through injector 93 is varied, and the fuel-air mixture drawn into cylinder 70 is "lean" in varying degree.

The ignition charge in the ignition chamber is, however, always the same, and the flame produced by its combustion is sufficiently hot and forceful to spread through chamber 76 and ignite any fuel therein and produce power in proportion to the fuel admitted.

It is evident that fuel may be supplied to the two air streams in any known manner, either timed or continuous, sprayed or non-atomized injection, or by suitable carburetion means.

A preferred manner of operating the auxiliary valve 82 and intake valve 74 is shown in FIG. 9. This timing diagram is similar to that shown in FIG. 8, but differs in that the auxiliary valve 82 opens first, at the beginning of the intake stroke as indicated by double arrow 98. Then it closes and the main inlet valve 74 opens for the remainder of the intake cycle as indicated by double arrow 99. The engine operates as before, except that the ignition chamber is charged at the beginning of the intake cycle instead of at the end. Several important advantages result from this change. The usual intake valve closing "overlap" at the end of the piston stroke may be retained, and the preparation of the fuel charge drawn into the ignition chamber may very closely follow the same procedure commonly employed in carbureted engines having a throttle. When cold, vaporization of the fuel is greatly assisted by lowering the pressure in the intake manifold, and this may be done for the ignition charge by placing a restrictive valve 100 in the auxiliary manifold 92. This valve is biased shut by a spring 101, and is opened by external air pressure when the manifold pressure is sufficiently reduced. In operation the auxiliary valve 82 opens at the beginning of the intake stroke. As the piston 71 begins its stroke, a vacuum is produced until the spring loaded valve 100 is opened. Then this vacuum is maintained at a uniform level while air (and fuel) is drawn into the ignition chamber as before in sufficient quantity to fill it at this reduced pressure. Then valve 82 closes, and valve 74 opens, allowing air at atmospheric pressure to rush in and quickly destroy the vacuum, and charge the cylinder in the normal manner.

Valve 82 is closed before intake valve 74 opens, so that the vacuum in the auxiliary intake manifold 92 is maintained during the subsequent cycles. Then, at the end of the exhaust stroke, when the combustion chamber 76 and ignition chamber 77 are filled with hot exhaust gases, the valve 82 opens and a rush of hot gases enters manifold 92 to destroy said vacuum before piston 71 begins its down stroke. This back flow of hot gases into the intake manifold, which is common to all throttled gasoline engines, is an important factor in producing an ignitable fuel-air mixture when the engine is cold. Under cold conditions, the intake manifold walls are wet with fuel, and this inrush of hot gases against the fuel causes a vaporization similar to that obtained in the first and second forms of engine described when liquid fuel is deposited on the heated walls of the combustion chambers. In this manner, the vaporization assistance which was obtained internally is obtained externally. The combined influence of vacuum and heating gives the engine the same stability as is common to throttled gasoline engines, but with one important exception. In throttled engines, the vacuum and exhaust heating effect vanishes when the throttle is opened wide, and gasoline engines are characterized by a tendency to "die" when they are cold and the throttle is opened wide. In this preferred form, the vacuum is maintained constant at all speeds and loads, and its stability exceeds that of the throttled engine. It is understood that the usual application of exhaust heat by conduction may also be employed, but instead of applying it to the entire charge as in the usual practice, it may be applied only to the auxiliary manifold, by means of an exhaust gas passage 103, with a corresponding increase of volumetric efficiency due to having a cold main intake manifold and cold charge.

As a further aid to maintaining stability during idle, no load operation, a throttle 102 is provided upstream from the valve 100 in the auxiliary intake manifold 92. This valve is maintained full open as shown at all times except on slow idle operation. At that time, the speed of the engine can be maintained constant by adjusting the throttle to a fixed restrictive position in a manner comparable to standard carburetion practice.

It is understood that the invention is not limited to the precise structure shown and described, but also includes such modifications as may be embraced within the scope of the appended claims.

We claim:

1. In the operation of an internal combustion engine of the type having a combustion chamber and an intake valve and employing two distinct types of fuel-air mixture in said combustion chamber, the method of forming said distinct fuel mixtures from fuel supply means outside of said combustion chamber, which includes as steps: introducing one distinct fuel-air mixture into said combustion chamber as a pre-mixed mixture through said intake valve, introducing unmixed liquid fuel through said intake valve into said combustion chamber, and combining said unmixed liquid fuel with a portion of said pre-mixed fuel-air mixture inside said combustion chamber to form said second distinct fuel-air mixture.

2. In an internal combustion engine having a piston and cylinder, the combination of: a combustion chamber in comunication with said cylinder; an ignition chamber separate from said cylinder; a passage connecting said ignition chamber to said combustion chamber; an intake valve communicating with said combustion chamber and positioned adjacent said connecting passage; and a liquid fuel injector outside of said combustion chamber but adjacent said intake valve and oriented such that when the intake valve is open, liquid fuel injected thereby passes through said open valve and is deposited in the vicinity of the juncture of said connecting passage with said combustion chamber.

3. In an internal combustion engine having a cylinder and piston, and fuel supply means, the combination of: a combustion chamber in communication with said cylinder; an ignition chamber separate from said combustion chamber; a passage connecting said ignition chamber to said combustion chamber; an intake valve communicating with said combustion chamber and positioned adjacent said connecting passage; an intake manifold in conjunction with said intake valve; fuel supply means for said intake manifold for supplying fuel to said combustion chamber; and a liquid fuel injector outside of said combustion chamber but adjacent said intake valve and adapted to deliver liquid fuel to said connecting passage through said intake valve when said valve is open.

4. In the operation of an internal combustion engine of the type having a cylinder and piston, a combustion chamber in communication with said cylinder, and an ignition chamber, separated from said combustion chamber by a connecting passage, the method of preparing a substantially stoichiometric fuel-air mixture for said ignition chamber and a fuel-air mixture containing excess air in variable quantity for said combustion chamber, which includes as steps: supplying a full charge of air in combination with a variable quantity of diffused fuel to said engine cylinder to form a fuel-air mixture of variable fuel-air ratio; independently supplying a quantity of unatomized liquid fuel to said connecting passage in a quantity substantially inversely proportional to the fuel supplied to said engine cylinder; and compressing a portion of said variable fuel-air mixture into said ignition chamber via said connecting passage to vaporize said unatomized fuel and form a substantially stoichiometric fuel-air mixture in said ignition chamber while compressing the remainder of said variable fuel-air mixture into said combustion chamber.

(References on following page)

References Cited by the Examiner

UNITED STATES PATENTS

| | | | |
|---|---|---|---|
| 1,802,848 | 4/1931 | Summers | 123—139.17 |
| 2,690,741 | 10/1954 | Broderson | 123—32 |
| 2,753,852 | 7/1956 | Beller | 123—32 |
| 2,793,628 | 5/1957 | Floyd | 123—28 |
| 2,803,230 | 8/1957 | Bensinger | 123—32 |
| 2,808,036 | 10/1957 | Von Seggern et al. | 123—32 |
| 2,808,037 | 10/1957 | Von Seggern et al. | 123—32 |

FOREIGN PATENTS

| | | |
|---|---|---|
| 892,828 | 1/1944 | France. |
| 1,265,070 | 5/1961 | France. |
| 655,262 | 1/1938 | Germany. |
| 735,230 | 8/1955 | Great Britain. |

MARK NEWMAN, *Primary Examiner.*

RICHARD B. WILKINSON, *Examiner.*